(12) United States Patent
Bala et al.

(10) Patent No.: US 8,994,206 B2
(45) Date of Patent: Mar. 31, 2015

(54) TURBINE-BASED ENERGY GENERATION SYSTEM WITH DC OUTPUT

(71) Applicant: ABB Technology AG, Zurich (CH)

(72) Inventors: Sandeep Bala, Raleigh, NC (US); Jiuping Pan, Raleigh, NC (US); Joseph A. Carr, Cary, NC (US); Peter Steimer, Ehrendingen (CH); Oscar Apeldoorn, Lengnau (CH); Stefan Linder, Zofingen (CH)

(73) Assignee: ABB Technology AG, Zurich (CH)

( * ) Notice: Subject to any disclaimer, the term of this patent is extended or adjusted under 35 U.S.C. 154(b) by 133 days.

(21) Appl. No.: 13/740,359

(22) Filed: Jan. 14, 2013

(65) Prior Publication Data

US 2014/0197639 A1 Jul. 17, 2014

(51) Int. Cl.
*F03D 9/00* (2006.01)
*H02K 47/02* (2006.01)
*H02J 3/38* (2006.01)
*H02M 7/483* (2007.01)

(52) U.S. Cl.
CPC ............... *H02K 47/02* (2013.01); *H02J 3/386* (2013.01); *H02M 7/483* (2013.01); *H02M 2007/4835* (2013.01)
USPC .......................................................... 290/55

(58) Field of Classification Search
CPC ...................................................... F03D 9/03
USPC .................................................... 290/44, 55
See application file for complete search history.

(56) References Cited

U.S. PATENT DOCUMENTS

| 7,324,359 | B2 | 1/2008 | Schreiber |
| 8,018,083 | B2 | 9/2011 | Larsen et al. |
| 8,129,853 | B2 * | 3/2012 | Abolhassani et al. .......... 290/44 |
| 8,174,138 | B2 | 5/2012 | Castelli Dezza et al. |

(Continued)

FOREIGN PATENT DOCUMENTS

| DE | 19620906 A1 | 1/1998 |
| DE | 102010023019 A1 | 12/2011 |

(Continued)

OTHER PUBLICATIONS

Baroudi, et al., "A Review of Power Converter Topologies for Wind Generators", IEEE, 2005, Department of Electrical and Computer Engineering, University of Alberta, 458-465.

(Continued)

*Primary Examiner* — Tho D Ta
(74) *Attorney, Agent, or Firm* — Murphy Bilak & Homiller, PLLC

(57) ABSTRACT

An energy generation system includes a turbine, an electric generator, a step-up transformer, and a converter. The turbine is operable to extract energy from a fluid flow and convert the extracted energy into mechanical energy. The electric generator is operable to convert the mechanical energy from the turbine into AC electrical energy. The step-up transformer is operable to transfer the AC electrical energy at a lower voltage from the electric generator to a higher voltage. The converter is operable to convert the AC electrical energy at the higher voltage to DC electrical energy. The converter includes a converter leg for a phase of the AC electrical energy. The converter leg has an upper arm with a first plurality of sub-modules and a lower arm with a second plurality of sub-modules. Each sub-module is operable to function as a controlled voltage source.

20 Claims, 8 Drawing Sheets

(56) References Cited

U.S. PATENT DOCUMENTS

| | | | |
|---|---|---|---|
| 8,503,202 B2* | 8/2013 | Chimento et al. | 363/56.03 |
| 8,552,577 B2* | 10/2013 | Lu et al. | 290/44 |
| 2002/0079706 A1* | 6/2002 | Rebsdorf et al. | 290/55 |
| 2008/0143111 A1* | 6/2008 | Ichinose et al. | 290/44 |
| 2010/0133901 A1 | 6/2010 | Zhang et al. | |
| 2011/0049994 A1 | 3/2011 | Hiller et al. | |
| 2011/0141773 A1* | 6/2011 | Larsen et al. | 363/35 |
| 2013/0197704 A1* | 8/2013 | Pan et al. | 700/287 |
| 2013/0200714 A1 | 8/2013 | Pan et al. | |

FOREIGN PATENT DOCUMENTS

| | | |
|---|---|---|
| EP | 2341594 A1 | 7/2011 |
| EP | 2408081 A1 | 1/2012 |
| WO | 0074198 A1 | 12/2000 |
| WO | 2009135728 A3 | 11/2009 |
| WO | 2011055175 A1 | 5/2011 |
| WO | 2012041380 A1 | 4/2012 |
| WO | 2012048743 A1 | 4/2012 |
| WO | 2013110327 A1 | 8/2013 |

OTHER PUBLICATIONS

Chen, et al., "DC/DC Conversion Systems Consisting of Multiple Converter Modules: Stability, Control, and Experimental Verifications", IEEE Transactions on Power Electronics, vol. 24, No. 6, Jun. 6, 2009, 1463-1474.

Garcia, et al., "Modeling and Control of Squirrel Cage Induction Generator with Full Power Converter Applied to Windmills", Oulun Yliopisto, University of Oulu, Nov. 30, 2009, 1-86.

Johnson, Brian K., "Current Control on a Superconducting High Voltage DC Mesh", University of Wisconsin-Madison, May 1989, 1-91.

Lena, Max et al., "Energy Evaluation for DC/DC Converters in DC-Based Wind Farms", Division of Electric Power Engineering, Department of Energy and Environment, Chalmers University of Technology, Goteborg, Sweden, 2007, 1-161.

Liserre, et al., "Overview of Multi-MW Wind Turbines and Wind Parks", IEEE Transactions on Industrial Electronics, vol. 58, No. 4, Apr. 4, 2011, 1081-1095.

Lopatkin, et al., "High-Voltage Bi-Directional DC-DC-Converter for Advanced Electric Locomotives", Power Electronics and Applications, 2009, EPE '09, 13th European Conference, Sep. 8-10, 2009, 1-10.

Lundberg, Stefan, "Evaluation of Wind Farm Layouts", Department of Electrical Power Engineering, Chalmers University of Technology, Goteborg, Sweden, 1-8.

Lundberg, Stefan, "Wind Farm Configuration and Energy Efficient Studies—Series DC Versus AC layouts", Department of Energy and Environment, Chalmers University of Technology, Goteborg, Seden 2006, ISBN 978-91-7291-884-9, 1-141.

Macken, et al., "A DC Bus System for Connecting Offshore Wind Turbines with the Utility System", Katholieke Universiteit Leuven, Department of Electrical Engineering, Leuven, Belgium, 1-6.

Max, et al., "Control Method and Snubber Selection for a 5 MW Wind Turbine Single Active Bridge DC/DC Converter", Chalmers University of Technology, Division of Energy and Environment, Goteborg, Sweden, 1-10.

Max, Lena, "Design and Control of a DC Collection Grid for a Wind Farm", Department of Energy and Environment, Chalmers University of Technology, Goteborg, Sweden, 2009, 1-167.

Meier, et al., "Benchmark of Annual Energy Production for Different Wind Farm Topologies", IEEE, 2005, Royal Institute of Technology, Electrical Machines and Power Electronics, Stockholm, Sweden, Vestas Wind Systems A/S R&D Converter Design, Hammel, Danmark, 2073-2080.

Meier, et al., "New Topology for More Efficient AC/DC Converters for Future Offshore Wind Farms", Royal Institute of Technology, Stockholm, Sweden, 1-6.

Meier, et al., "New Voltage Source Converter Topology for HVDC Grid Connection of Offshore Wind Farms", Proceedings of EPE-PEMC, Sep. 2004, Latvia, 1-8.

Meyer, et al., "Key Components for Future Offshore DC Grids", Aachener Beitrage des ISEA, vol. 46, Sep. 2007, Institute for Power Electronics and Electrical Drives, RWTH Aachen University, 1-98.

Mogstad, et al., "A Power Conversion System for Offshore Wind Parks", IEEE, Norwegian University of Science and Technology, Department of Electric Power Engineering, Trondheim, Norway, 2106-2112.

Mogstad, et al., "Power Collection and Integration on the Electric Grid from Offshore Wind Parks", NORPIE, Nordic Workshop on Power and Industrial Electronics, Norweigan University of Science and Technology, Department of Electric Power Engineering, Trondheim, Norway, Jun. 9-11, 2008, 1-8.

NORPIE, "4th Nordic Workshop on Power and Industrial Electronics", NTNU, Norweigan University of Science and Technology, Department of Electrical Power Engineering, Jun. 14-16, 2014, 1-7.

Oates, Colin, "A Methodology for Developing 'Chainlink' Converters", Areva T&D Pes, 1-10.

Pan, et al., "DC Connection for Large-Scale Wind Farms", ABB Research Corp., 1-7.

Prasai, et al., "A New Architecture for Offshore Wind Farms", IEEE Transactions on Power Electronics, vol. 23, No. 3, May 2008, 1198-1204.

Ranganathan, et al., "A Regulated DC-DC Voltage Source Converter Using a High Frequency Link", IEEE Transactions on Industry Applications, vol. 1A-18, No. 3, May/Jun. 1982, 279-287.

Steimer, et al., "Medium Voltage Power Conversion Technology for Efficient Windpark Power Collection Grids", 2010 2nd IEEE International Symposium on Power Electronics for Distributed Generation Systems, 12-18.

Takei, et al., "The Reverse Blocking IGBT for Matrix Converter with Ultra-Thin Wafer Technology", Fuji Electric Corporate Research and Development, Ltd., Japan, 1-4.

Yuan, Xibo, "Low Voltage Ride Through Control of a Cascaded High Power Converter for Direct-Drive Permanent Magnet Wind Generators", IEEE, 2012, Department of Electrical and Electronic Engineering, The University of Bristol, Brisol, UK, 3553-3559.

Zinov'ev, et al., "High-Voltage DC-DC Converter for New-Generation Electric Locomotives", ISSN 1068-3712, Russian Electrical Engineering, 2009, vol. 80, No. 12, Allerton Press, Inc., 685-690.

* cited by examiner

TURBINE-BASED ENERGY GENERATION SYSTEM WITH DC OUTPUT

TECHNICAL FIELD

The instant application relates to turbine-based energy generation systems, and more particularly to turbine-based energy generation systems having a DC output.

BACKGROUND

Energy from a turbine is converted into a form suitable for collection of energy from multiple turbines. This is preferably done cost-effectively, safely, and with few system failures. US20110049994A1 describes a wind farm with DC collection, in which the power conversion chain in the tower includes a generator and a modular multi-level (MMC) rectifier with unipolar modules. U.S. Pat. No. 8,174,138 B2 and WO2011055175A1 describe a wind generator-rectifier setup with rectifier modules stacked on the DC side. US20100133901A1 describes a power delivery system with identical stacked modular converters at either end of a DC transmission line. U.S. Pat. No. 8,018,083 B2 describes a wind generator-rectifier setup with a matrix converter, step-up transformer and rectifier feeding a high voltage DC collection grid. U.S. Pat. No. 7,324,359 B2 describes a wind generator-rectifier setup with a multi-winding step-up transformer feeding two-level rectifier modules stacked on the DC side. WO2012041380A1 describes an MMC rectifier with both unipolar modules which produce unipolar voltages and bipolar modules which produce bipolar voltages, for enabling fault handling capabilities. WO2012048743A1 describes cluster platform based solutions with a reduced number of components in the wind tower.

SUMMARY

A turbine-based energy generation system is described herein which includes an electric generator for converting mechanical energy from a turbine into AC electrical energy and a converter for converting the AC electrical energy to DC electrical energy. A step-up transformer is provided between the generator and the converter. The step-up transformer increases the DC output voltage of the system, provides high voltage isolation to the generator, and enables more efficient energy collection.

According to an embodiment of an energy generation system, the system comprises a turbine, an electric generator, a step-up transformer, and a converter. The turbine is operable to extract energy from a fluid flow such as air or other gas, or water or other liquid. The electric generator is operable to convert the mechanical energy from the turbine into AC electrical energy. The step-up transformer is operable to transfer the AC electrical energy at a lower voltage from the electric generator to a higher voltage. The converter is operable to convert the AC electrical energy at the higher voltage to DC electrical energy. The converter comprises a converter leg for a phase of the AC electrical energy. The converter leg has an upper arm with a first plurality of sub-modules and a lower arm with a second plurality of sub-modules. Each sub-module is operable to function as a controlled voltage source.

According to an embodiment of a method of generating electrical energy, the method comprises: extracting energy from a fluid flow; converting the extracted energy into mechanical energy; converting the mechanical energy into AC electrical energy; transferring the AC electrical energy from a lower voltage to a higher voltage using a step-up transformer; and converting the AC electrical energy at the higher voltage to DC electrical energy using a converter comprising a converter leg for a phase of the AC electrical energy, the converter leg having an upper arm with a first plurality of sub-modules and a lower arm with a second plurality of sub-modules, each sub-module operable to function as a controlled voltage source.

According to another embodiment of an energy generation system, the system comprises a plurality of turbines each operable to extract energy from a fluid flow and convert the extracted energy into mechanical energy, a plurality of electric generators each operable to convert the mechanical energy from one of the turbines into AC electrical energy, and a plurality of step-up transformers each operable to transfer the AC electrical energy at a lower voltage from one of the electric generators to a higher voltage. The system further comprises a plurality of converters each operable to convert the AC electrical energy at the higher voltage from one of the step-up transformers to DC electrical energy. Each converter comprises a converter leg for each phase of the AC electrical energy coupled to that converter. Each converter leg has an upper arm with a first plurality of sub-modules and a lower arm with a second plurality of sub-modules. Each sub-module is operable to function as a controlled voltage source.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings.

DETAILED DESCRIPTION

Figure 1:
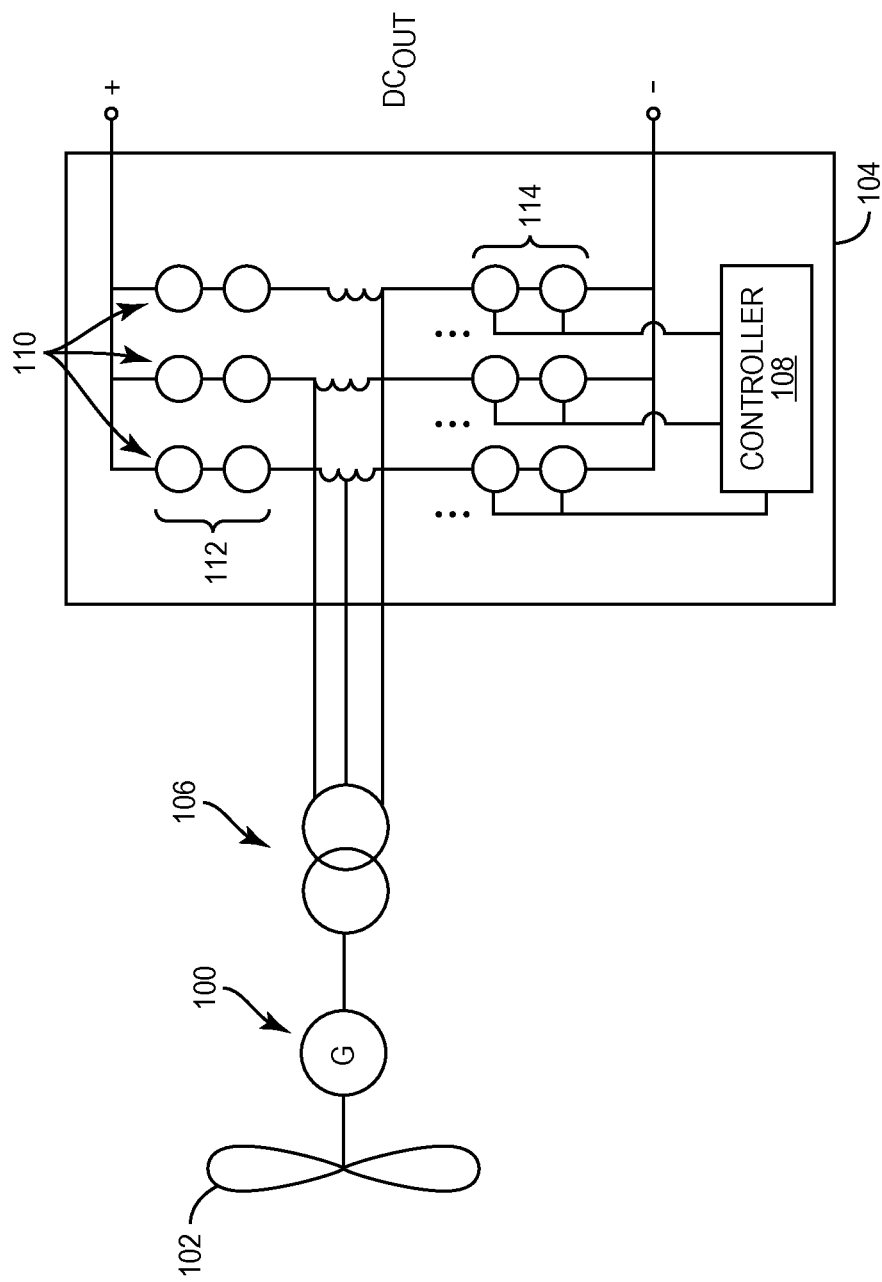
FIG. 1 illustrates a block diagram of an embodiment of a turbine-based energy generation system which includes a step-up transformer for coupling an electric generator to a converter.

FIG. 1 illustrates an embodiment of a turbine-based energy generation system which includes an electric generator (G)

100 for converting mechanical energy from a turbine 102 into AC electrical energy, and a converter 104 for converting the AC electrical energy to DC electrical energy at the system output (+/−$DC_{OUT}$). The turbine 102 extracts energy from a fluid flow such as air or other gas, or water or other liquid. For example, the turbine 102 can be a wind, wave, or tidal turbine which converts the extracted energy into mechanical energy. The generator output is typically between about 3.3 kV and 13.8 kV, but other ranges are within the scope of the embodiments described herein. Tangential components of the system which are not germane to the invention are excluded from FIG. 1 for ease of illustration, such as AC breakers, control devices, monitoring equipment, etc.

A step-up transformer 106 is provided between the generator 100 and the converter 104 to increase the DC output voltage of the system and enable more efficient energy collection. The step-up transformer 106 transfers the AC electrical energy at a lower voltage from the electric generator 100 to a higher voltage toward the converter 104. The step-up transformer 106 transfers the AC electrical energy from the electric generator 100 to at least 10 kV e.g. to at least 25 kV, 60 kV or even higher. For wind tower applications, the addition of the step-up transformer 106 permits a wind tower to output higher DC output voltage as compared to conventional wind towers. Doing so enables more efficient collection and transmission over longer distances without any need for an additional substation/platform. If the nominal frequency of the generator 100 is greater than 60 Hz, a smaller step-up transformer 106 can be used which makes installation easier in wind tower applications. In one embodiment, the step-up transformer 106 is an autotransformer.

The converter 104 converts the AC electrical energy at the higher voltage from the step-up transformer 106 to DC electrical energy. Operation of the converter is managed by a controller 108. In one embodiment, the converter 104 is a modular multi-level converter (MMC). The use of an MMC 104 yields a lower-cost system as compared to conventional solutions, while maintaining high controllability of the generator output. An MMC 104 permits scalable output voltage, a variety of installation and arrangement options, and/or improved fault handling characteristics. For example in a wind tower application, the turbine-based energy generation system with DC output uses fewer conversion stages in the tower as compared to a tower with AC output. This in turn lowers the overall system cost as compared to a wind farm with AC collection.

In the case of an MMC-based converter 104, a converter leg 110 is provided for each phase of the AC electrical energy. The converter legs 110 of the MMC 104 each have an upper arm with a first plurality of sub-modules 112 and a lower arm with a second plurality of sub-modules 114. The sub-modules 112, 114 comprise switching cells such as power semiconductor transistors and an energy storage device such as a DC capacitor, a thyristor bypass device, auxiliary units such as gate drivers, etc. Each sub-module 112, 114 functions as a controlled voltage source. The sub-modules 112, 114 can comprise unipolar or bipolar cells, where each cell is a two-terminal arrangement of semiconductor switches and energy storage element(s). Unipolar cells produce unipolar voltages, and bipolar cells produce bipolar voltages.

Figure 2:
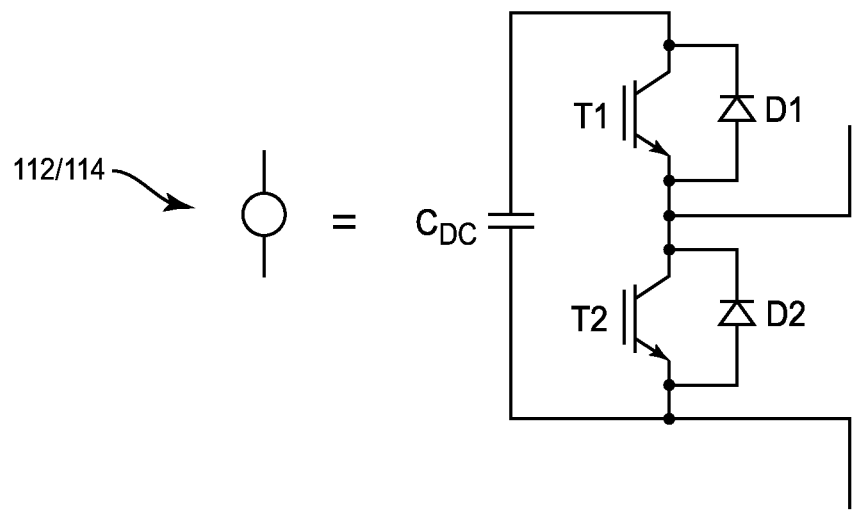
FIG. 2 illustrates a schematic diagram of an embodiment of a unipolar cell included in the converter of the turbine-based energy generation system.

FIG. 2 shows an embodiment of a unipolar cell included in an individual sub-module 112/114 of the MMC 104. The unipolar cell includes a pair of power transistors T1, T2 connected in a half-bridge configuration, in parallel with a DC capacitor $C_{DC}$. Each power transistor T1, T2 is coupled in parallel with a corresponding freewheeling diode D1, D2.

Figure 3:
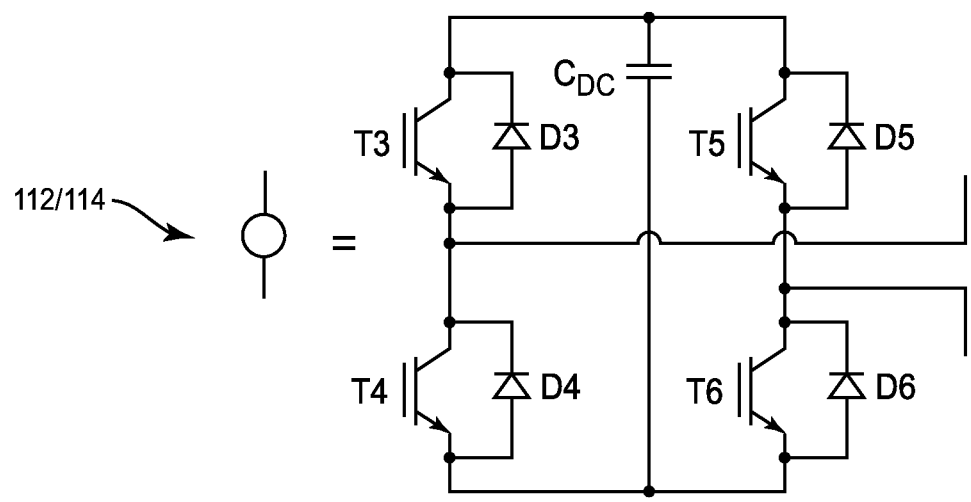
FIG. 3 illustrates a schematic diagram of an embodiment of a bipolar cell included in the converter of the turbine-based energy generation system.

FIG. 3 shows an embodiment of a bipolar cell included in an individual sub-module 112/114 of the MMC 104. The bipolar cell includes two pairs of power transistors T3, T4 and T5, T6 connected in a full-bridge configuration, in parallel with a DC capacitor $C_{DC}$. Each power transistor T3, T4, T5, T6 is coupled in parallel with a corresponding freewheeling diode D3, D4, D5, D6.

In some embodiments, both unipolar and bipolar cells can be used in the converter 104. In these cases, the sub-modules 112/114 with bipolar cells can reduce the voltage of the DC electrical energy output by the system by reversing their DC output polarity responsive to a detected DC fault or voltage collapse condition (i.e. an error condition). Doing so limits the DC fault current.

The converter controller 108 can shut down all of the sub-modules 112, 114 or short-circuit all of the sub-modules 112, 114 responsive to an error condition. The controller 108 can shut down or short circuit the converter sub-modules 112, 114 by turning off the gate signals to the sub-module cells. Various error conditions can cause the controller 108 to take this corrective action, e.g. such as short circuits, DC/AC current exceeding a maximum value, overvoltage, the system voltage falls below either a fixed value or a converter operation point dependent value, etc. In each case, the controller 108 can detect the error condition or receive error information from an external detector or another controller.

The turbine-based energy generation system described herein can be deployed in various applications with different configurations. For example, the turbine-based energy generation system can be used in wind, wave, or tidal power generation applications.

Figure 4:
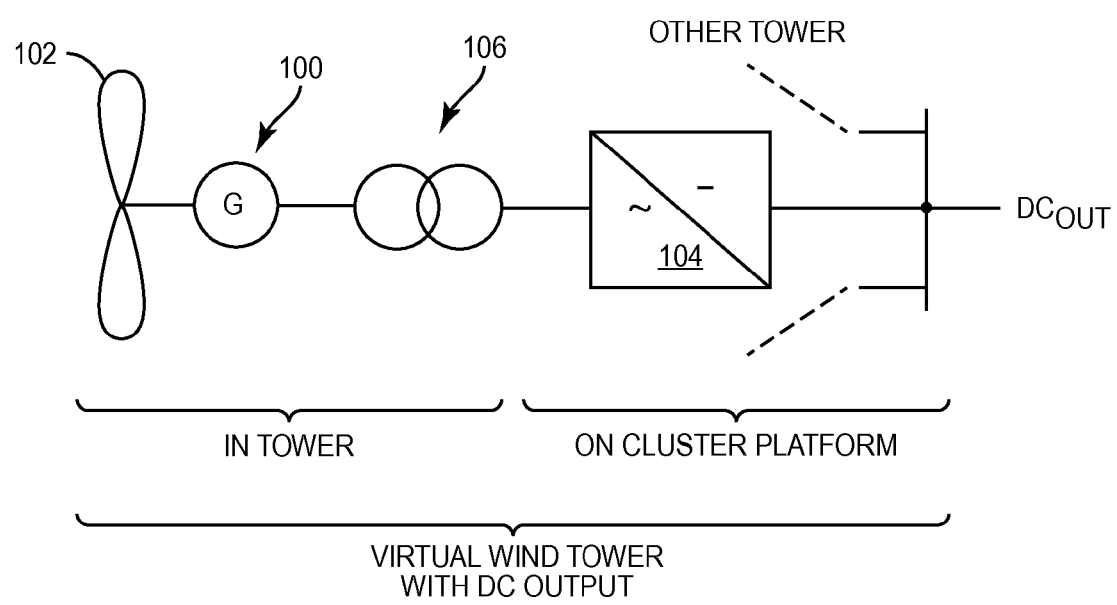
FIG. 4 illustrates a block diagram of an embodiment of the turbine-based energy generation system deployed in a wind tower application.

FIG. 4 illustrates an embodiment of the turbine-based energy generation system deployed in a wind tower application. According to this embodiment, a group (farm) of wind towers is provided. A turbine-based energy generation system as described herein is associated with each individual wind tower. The components of a single wind tower-based system are shown in FIG. 4 for ease of illustration. Some of the system components are collocated in the physical tower (represented by the text label 'in tower' in FIG. 4) and other components are disposed outside the tower e.g. on an offshore (cluster) platform (represented by the text label 'on cluster platform' in FIG. 4), forming a virtual wind tower farm with a DC output ($DC_{OUT}$). In one embodiment, at least a rotor (i.e. rotating shaft) of each turbine 102 and the corresponding electric generator 100 are housed in a nacelle of the physical wind tower structure, and the converters 104 are located outside the nacelle. The rotor for a typical utility-scale wind turbine includes three high-tech blades, a hub, and a spinner. The nacelle of a wind turbine is the box-like component that sits atop the tower and is connected to the rotor. The nacelle and generator 100 are mounted on top of a high tower to allow the rotor blades to take advantage of the best winds. The rotor, nacelle, and physical tower structure are not shown in FIG. 4 for ease of illustration. These components of a wind tower are well known to those skilled in the art, and therefore no further description or illustration is provided.

In one embodiment, the wind tower system is located offshore. According to this embodiment, the converters can be located on an offshore platform. However, the converters instead can be located in the respective towers or elsewhere depending on the specific wind tower application. The step-up transformers 106 can be in the same physical wind tower structure as the corresponding turbine 102 and electric generator 100 or in a different structure.

As shown in FIG. 4, a separate step-up transformer 106 and a separate converter 104 are provided for each wind tower in the farm (the other wind towers are represented by the text label 'other tower' in FIG. 4). Alternatively, a separate step-up transformer 106 can be provided for each wind tower in the farm and a single converter 104 can be used to convert the AC electrical energy at the higher voltage from all of the step-up transformers 106 to DC electrical energy. In yet another embodiment, a single step-up transformer 106 is provided for transferring the AC electrical energy at a lower voltage from all of the electric generators 100 to a higher voltage and a single converter 104 is provided for converting the AC electrical energy at the higher voltage from the single step-up transformer 106 to DC electrical energy.

In general, the step-up transformer 106 used in the turbine-based energy generation system can be a single multi-phase transformer e.g. with three phases as shown in FIG. 1.

Figure 5:
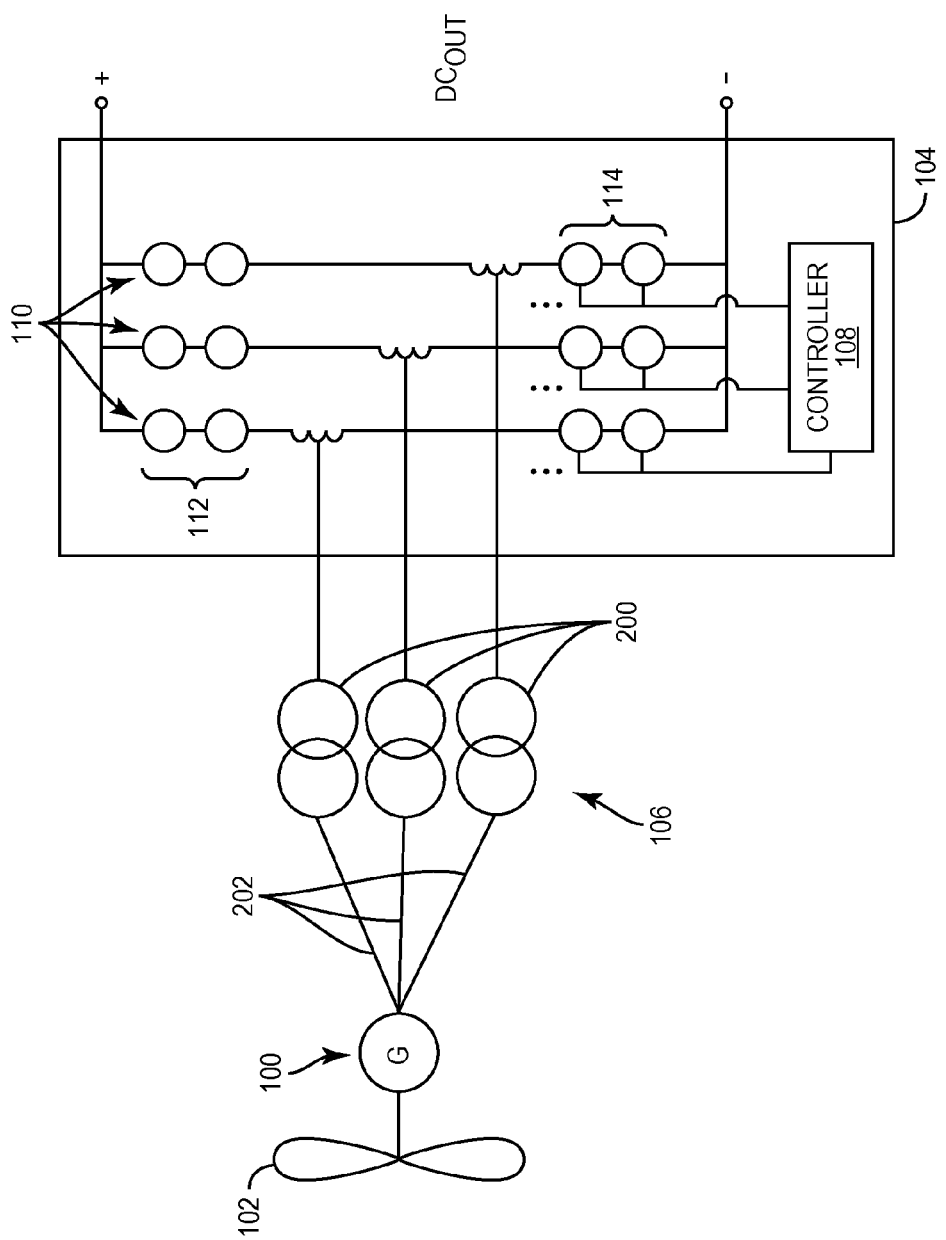
FIG. 5 illustrates a block diagram of an embodiment of the step-up transformer of the turbine-based energy generation system.

FIG. 5 illustrates another embodiment of the step-up transformer 106, implemented as a plurality of cores 200 each one of which is coupled to a different phase 202 of the electric generator 100. Each leg 110 of the converter 104 is connected to a different core 200 of the step-up transformer 106. The cores 200 of the step-up transformer 106 can be vertically spaced apart from one other e.g. located on different floors of a wind tower or other structure. Each leg 110 of the converter 104 can be located on the same floor of the wind tower structure as the transformer core 200 to which that converter leg 110 is coupled. As such, the parts of each phase of the turbine-based energy generation system can be housed together and the phases located on separate floors in a wind tower or other structure.

Figure 6:
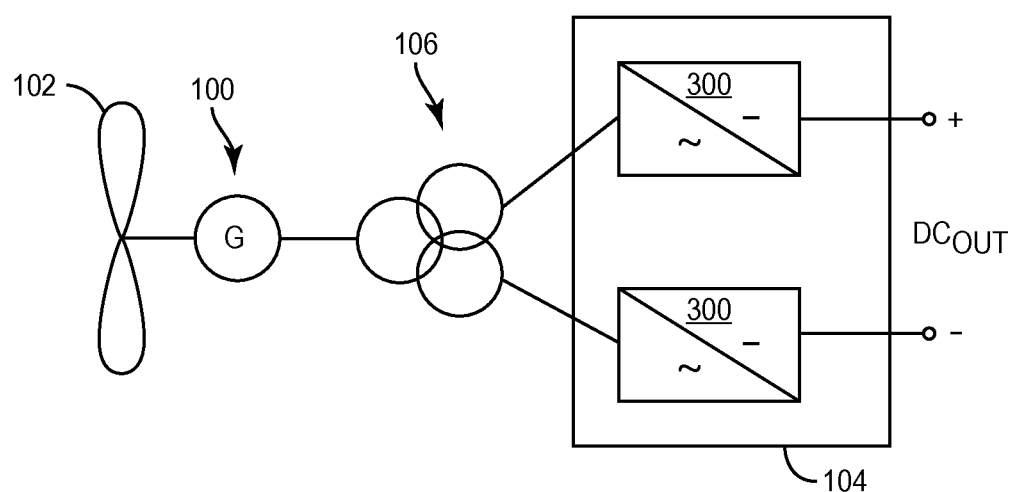
FIG. 6 illustrates a block diagram of an embodiment of the step-up transformer and converter of the turbine-based energy generation system.

FIG. 6 illustrates another embodiment of the turbine-based energy generation system. According to this embodiment, a multi-winding step-up transformer 106 is used (three phases are shown in FIG. 5). The multi-winding step-up transformer 106 transfers AC electrical energy at a lower voltage from the electric generator 100 on one side to a higher voltage toward the converter 104 on the other side, as previously described herein. In this case, the converter 104 includes MMC-based rectifier subsystems 300 in cascade. Using MMC-based rectifiers 300 reduces system cost while maintaining high controllability of the generator output, as previously described herein.

The embodiments illustrated in FIGS. 1-6 are applicable to any turbine-based generation source (e.g. wind, tidal, etc.), can use unipolar and/or bipolar cells in the same converter, can use a multi-winding step-transformer with series-connected rectifiers at the transformer output, can permit different physical location of components within a wind tower or other structure, and/or can use an autotransformer as previously described herein.

In some examples, wind towers with a DC output may have protection actions such as opening or shorting of the converter sub-modules, connection of multiple generators to a single transformer and converter, multiple turbines having a point-of-common-coupling either on the DC or AC side of an inverter, and/or series and parallel connections of windmills. In another example, medium voltage (MV) collection wind parks can provide connection of multiple converters to a medium voltage bus. In this case, the wind mill generators are isolated from the DC bus by the step-up transformer(s), limiting short circuit currents.

Figure 7:
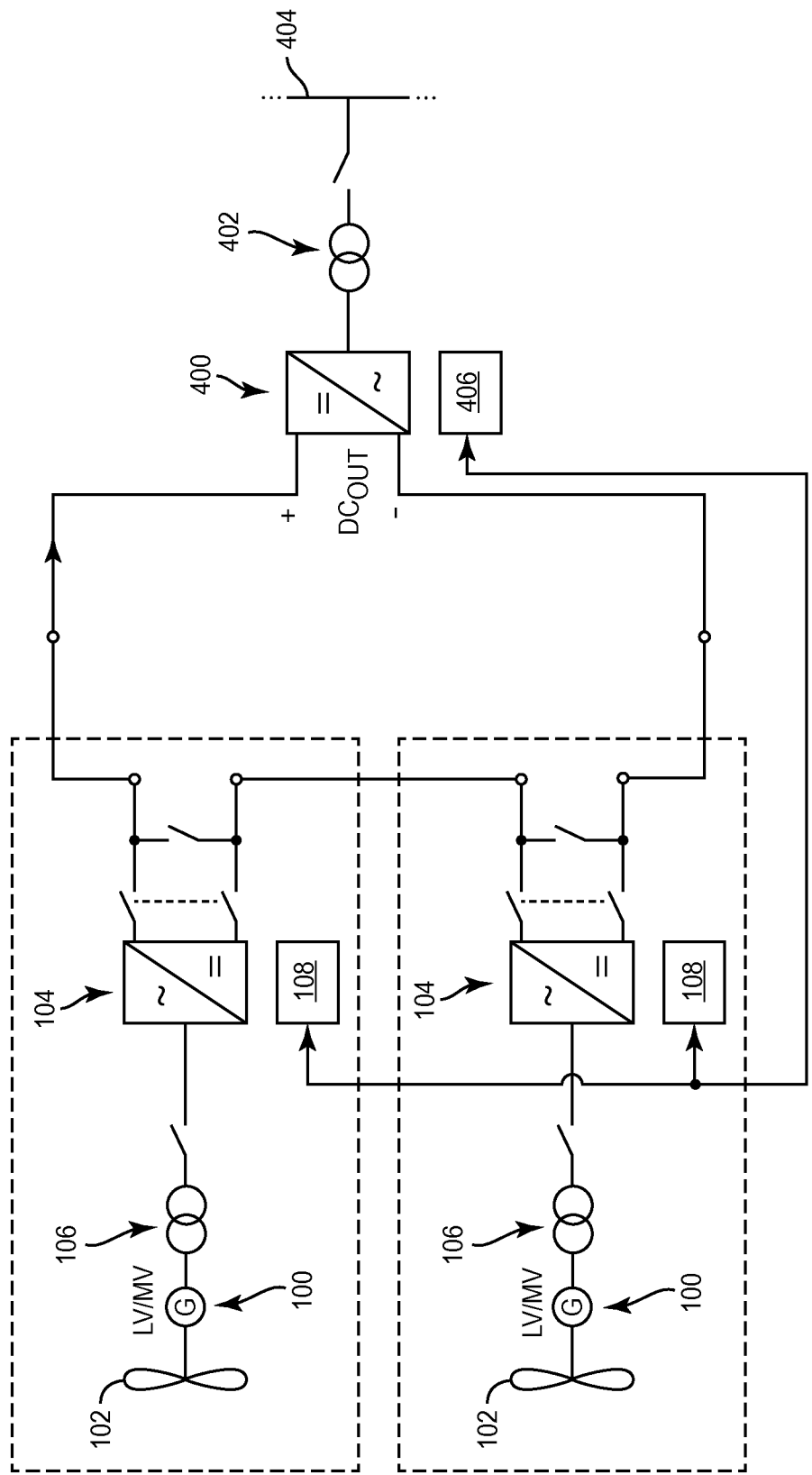
FIG. 7 illustrates a block diagram of an embodiment of the turbine-based energy generation system deployed in a high voltage wind park application.

FIG. 7 illustrates an embodiment of a MV power collection wind park which employs the turbine-based energy generation system described herein and has MV DC power collection. According to this embodiment, the MV power collection wind park includes a plurality of turbines 102 each for extracting energy from a fluid flow and converting the extracted energy into mechanical energy, a plurality of electric generators 100 each for converting the mechanical energy from one of the turbines into AC electrical energy, and a plurality of step-up transformers 106 each for transferring the AC electrical energy at a lower voltage from one of the electric generators 100 to a higher voltage. The step-up transformers 106 also isolate the generators 100 from the high voltage part of the MV power collection wind park.

The MV power collection wind park also includes a plurality of converters 104 each for converting the AC electrical energy at the higher voltage from one of the step-up transformers 106 to DC electrical energy. Each converter 104 includes a converter leg 110 for each phase of the AC electrical energy coupled to that converter 104. Each converter leg 110 has an upper arm with a first plurality of sub-modules and a lower arm with a second plurality of sub-modules, each sub-module functioning as a controlled voltage source as previously described herein. The converter sub-modules are not shown in FIG. 7 for ease of illustration.

Each generator 100 is a low voltage (LV) or medium voltage (MV) generator which generates e.g. 5-10 MW of power. The step-up transformers 106 provide high voltage isolation for the generators 100, and increase the voltage from the generators 100. The converters 104 are connected in series, yielding a high voltage DC output. An inverter 400 can be provided at the DC output ($DC_{OUT}$) of the MV power collection wind park for converting the DC output to AC. The inverter 400 can be an MMC or other type of inverter. A transformer 402 couples the AC energy from the inverter 400 e.g. to an AC grid or other power transmission system 404. A separate controller 108/406 can be provided for each converter 104 and inverter 400, for controlling individual operation of the converters 104 and inverter 400. The controllers 108, 406 can coordinate between each other, or a master controller can be provided for coordinating operation.

Figure 8:
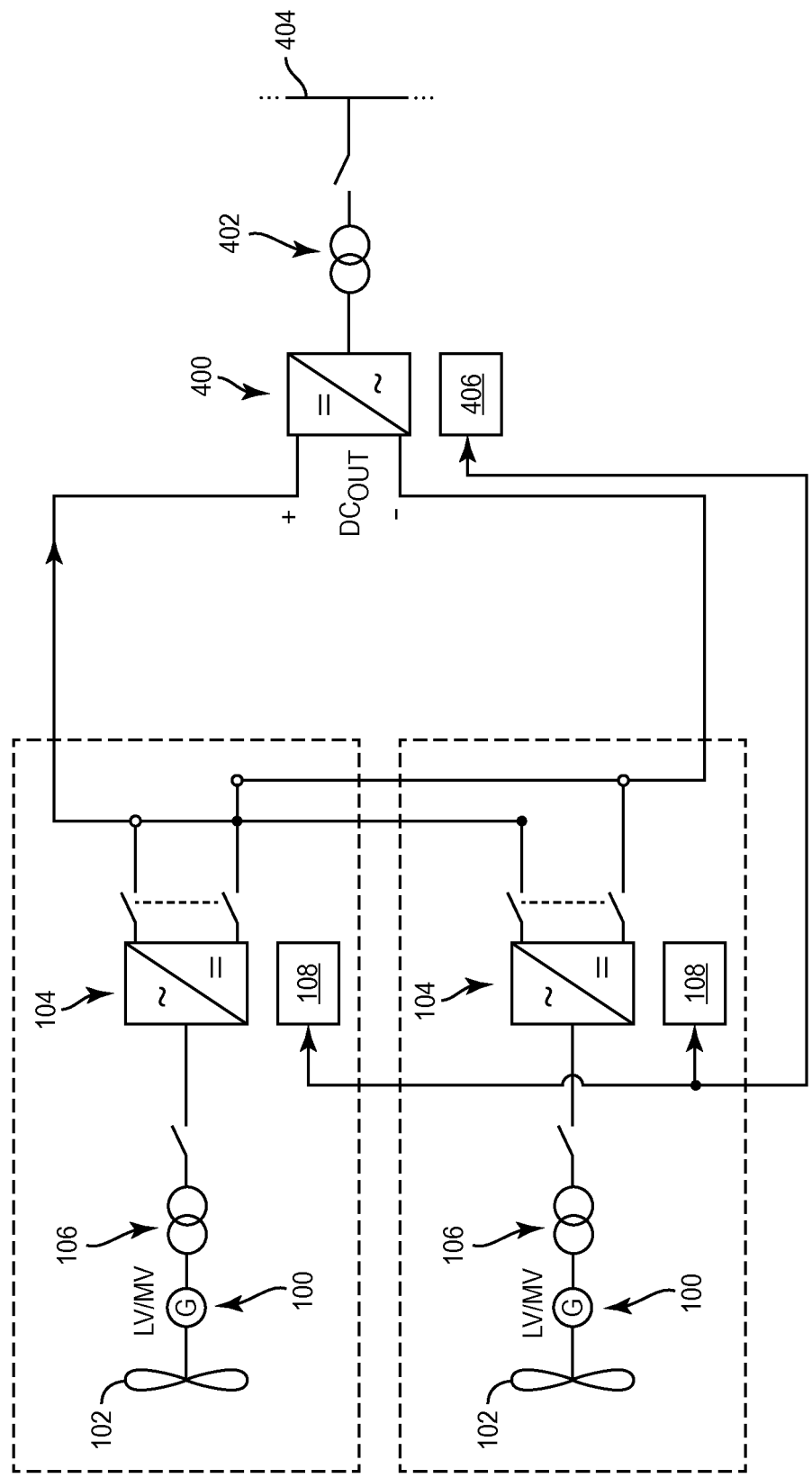
FIG. 8 illustrates a block diagram of another embodiment of the turbine-based energy generation system deployed in a high voltage wind park application.

FIG. 8 illustrates another embodiment of a MV power collection wind park. The embodiment shown in FIG. 8 is similar to the one shown in FIG. 7, however the converters 104 are connected in parallel instead of in series.

Figure 9:
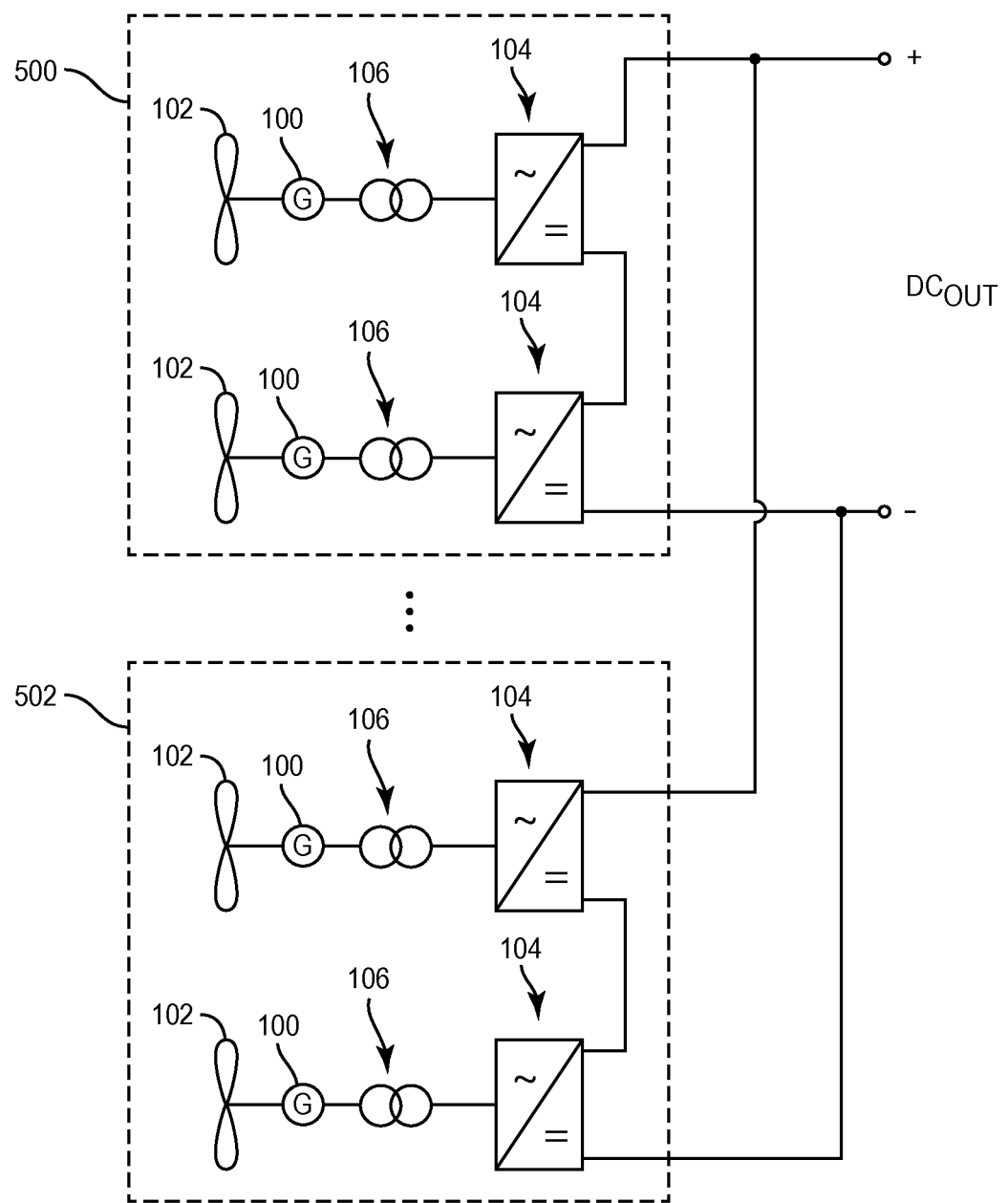
FIG. 9 illustrates a block diagram of yet another embodiment of the turbine-based energy generation system deployed in a high voltage wind park application.

FIG. 9 illustrates yet another embodiment of a MV power collection wind park. The embodiment shown in FIG. 9 is similar to the one shown in FIG. 7, however a first group 500 of the converters 104 is connected in series and a second group 502 of the converters 104 is connected in parallel with the first group 500. The turbine-based energy generation systems including the second group 502 of converters 104 are represented by a single dashed box in FIG. 9 for ease of illustration, but have the same or similar construction as the turbine-based energy generation systems including the first group 500 of converters 104 connected in series which are shown in FIG. 9. One or more of the converters 104 shown in FIG. 7-9 can be an MMC as previously described herein.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. An energy generation system, comprising:
a turbine operable to extract energy from a fluid flow and convert the extracted energy into mechanical energy;
an electric generator operable to convert the mechanical energy from the turbine into AC electrical energy;
a step-up transformer operable to transfer the AC electrical energy at a lower voltage from the electric generator to a higher voltage; and
a converter operable to convert the AC electrical energy at the higher voltage to DC electrical energy, the converter comprising a converter leg for a phase of the AC electrical energy, the converter leg having an upper arm with a first plurality of sub-modules and a lower arm with a second plurality of sub-modules, each sub-module operable to function as a controlled voltage source.

2. The energy generation system according to claim 1, wherein at least a rotor of the turbine and the electric generator are housed in a nacelle, and wherein the converter is located outside the nacelle.

3. The energy generation system according to claim 1, wherein each sub-module of the converter comprises a unipolar cell or a bipolar cell.

4. The energy generation system according to claim 3, wherein the sub-modules with the bipolar cells are operable to reduce the voltage of the DC electrical energy responsive to a detected DC fault or voltage collapse condition.

5. The energy generation system according to claim 1, further comprising a controller operable to shut down all of the sub-modules or short-circuit all of the sub-modules responsive to an error condition detected by the controller or error information received by the controller.

6. The energy generation system according to claim 1, wherein the step-up transformer comprises a plurality of cores each one of which is coupled to a different phase of the electric generator, and wherein the converter has a plurality of converter legs, each converter leg being connected to a different core of the step-up transformer.

7. The energy generation system according to claim 6, wherein the cores of the step-up transformer are vertically spaced apart from one another.

8. The energy generation system according to claim 7, wherein each converter leg is located on the same floor of a wind tower as the core to which that converter leg is coupled.

9. The energy generation system according to claim 1, further comprising at least one modular multi-level converter connected in series with the converter.

10. The energy generation system according to claim 1, wherein the electric generator is operable to output the AC electrical energy at a voltage between 3.3 kV and 13.8 kV, and wherein the step-up transformer is operable to transfer the AC electrical energy from the electric generator to at least 10 kV.

11. The energy generation system according to claim 1, wherein the step-up transformer is an autotransformer.

12. The energy generation system according to claim 1, further comprising:
a plurality of additional turbines each operable to extract energy from a fluid flow and convert the extracted energy into mechanical energy; and
a plurality of electric generators each operable to convert the mechanical energy from one of the additional turbines into AC electrical energy.

13. The energy generation system according to claim 12, further comprising a plurality of additional step-up transformers each operable to transfer the AC electrical energy at a lower voltage from one of the additional electric generators to a higher voltage, and wherein the same converter is operable to convert the AC electrical energy at the higher voltage from all of the step-up transformers to DC electrical energy.

14. The energy generation system according to claim 12, wherein the same step-up transformer is operable to transfer the AC electrical energy at a lower voltage from all of the electric generators to a higher voltage, and wherein the same converter is operable to convert the AC electrical energy at the higher voltage from the step-up transformer to DC electrical energy.

15. A method of generating electrical energy, the method comprising:
extracting energy from a fluid flow using a turbine;
converting the extracted energy into mechanical energy;
converting the mechanical energy into AC electrical energy using an electric generator;
transferring the AC electrical energy from a lower voltage to a higher voltage using a step-up transformer; and
converting the AC electrical energy at the higher voltage to DC electrical energy using a converter comprising a converter leg for a phase of the AC electrical energy, the converter leg having an upper arm with a first plurality of sub-modules and a lower arm with a second plurality of sub-modules, each sub-module operable to function as a controlled voltage source.

16. The method according to claim 15, wherein each sub-module of the converter comprises a unipolar cell or a bipolar cell, the method further comprising reducing the voltage of the DC electrical energy via the sub-modules with the bipolar cells responsive to a detected DC fault or voltage collapse condition.

17. An energy generation system, comprising:
a plurality of turbines each operable to extract energy from a fluid flow and convert the extracted energy into mechanical energy;
a plurality of electric generators each operable to convert the mechanical energy from one of the turbines into AC electrical energy;
a plurality of step-up transformers each operable to transfer the AC electrical energy at a lower voltage from one of the electric generators to a higher voltage; and
a plurality of converters each operable to convert the AC electrical energy at the higher voltage from one of the step-up transformers to DC electrical energy, each converter comprising a converter leg for each phase of the AC electrical energy coupled to that converter, each converter leg having an upper arm with a first plurality of sub-modules and a lower arm with a second plurality of sub-modules, each sub-module operable to function as a controlled voltage source.

18. The energy generation system according to claim 17, wherein the converters are connected in series.

19. The energy generation system according to claim 17, wherein the converters are connected in parallel.

20. The energy generation system according to claim 17, wherein a first group of the converters are connected in series and a second group of the converters is connected in parallel with the first group.

* * * * *